US011294470B2

(12) United States Patent
Dal Zot et al.

(10) Patent No.: US 11,294,470 B2
(45) Date of Patent: Apr. 5, 2022

(54) HUMAN-TO-COMPUTER NATURAL THREE-DIMENSIONAL HAND GESTURE BASED NAVIGATION METHOD

(71) Applicant: SOFTKINETIC SOFTWARE, Brussels (BE)

(72) Inventors: David Dal Zot, Orbais (BE); Antoine Rennuit, La Madeleine (FR); Kevin Simons, Ixelles (BE)

(73) Assignee: Sony Depthsensing Solutions SA/NV, Brussels (BE)

( * ) Notice: Subject to any disclaimer, the term of this patent is extended or adjusted under 35 U.S.C. 154(b) by 634 days.

(21) Appl. No.: 14/897,041

(22) PCT Filed: Jan. 6, 2015

(86) PCT No.: PCT/EP2015/050091
§ 371 (c)(1),
(2) Date: Dec. 9, 2015

(87) PCT Pub. No.: WO2015/104257
PCT Pub. Date: Jul. 16, 2015

(65) Prior Publication Data
US 2016/0124513 A1 May 5, 2016

(30) Foreign Application Priority Data
Jan. 7, 2014 (EP) .................................... 14150363

(51) Int. Cl.
*G06F 3/01* (2006.01)
*G06F 3/03* (2006.01)
(Continued)

(52) U.S. Cl.
CPC .............. *G06F 3/017* (2013.01); *G06F 3/011* (2013.01); *G06F 3/0304* (2013.01); *G06F 3/0485* (2013.01); *G06K 9/00355* (2013.01)

(58) Field of Classification Search
CPC ........ G06F 3/017; G06F 3/011; G06F 3/0304; G06F 3/04842; G06F 3/04883;
(Continued)

(56) References Cited

U.S. PATENT DOCUMENTS 5,724,264 A 3/1998 Rosenberg et al.
5,936,612 A 8/1999 Wang
(Continued)

FOREIGN PATENT DOCUMENTS

CN 101730874 A 6/2010
CN 101977796 A 2/2011
(Continued)

OTHER PUBLICATIONS

International Search Report and Written Opinion for International Application No. PCT/EP2013/064860 dated Mar. 20, 2014.
(Continued)

*Primary Examiner* — Hua Lu
(74) *Attorney, Agent, or Firm* — Wolf, Greenfield & Sacks, P.C.

(57) ABSTRACT

Described herein is a method for enabling human-to-computer three-dimensional hand gesture-based natural interactions. From depth images provided by a range finding imaging system, the method enables efficient and robust detection of a particular sequence of natural gestures including a beginning (start), and an ending (stop) of a predetermined type of natural gestures for delimiting the period during which a control (interaction) gesture is operating in an environment wherein a user is freely moving his hands. The invention is more particularly, although not exclusively, concerned by detection without any false positives nor delay, of intentionally performed natural gesture subsequent to a starting finger tip or hand tip based natural gesture so as to provide efficient and robust navigation, zooming and scroll-
(Continued)

ing interactions within a graphical user interface up until the ending finger tip or hand tip based natural gesture is detected.

20 Claims, 4 Drawing Sheets

(51) Int. Cl.
*G06F 3/0485* (2013.01)
*G06K 9/00* (2006.01)

(58) Field of Classification Search
CPC .... G06F 3/005; G06F 3/04815; G06F 3/0485; G06F 3/04845; G06K 9/00355
See application file for complete search history.

(56) References Cited

U.S. PATENT DOCUMENTS

| | | | |
|---|---|---|---|
| 8,488,888 B2 | 7/2013 | Balan et al. | |
| 8,615,108 B1 | 12/2013 | Stoppa et al. | |
| 8,639,020 B1* | 1/2014 | Kutliroff | G06K 9/00 382/154 |
| 8,655,021 B2 | 2/2014 | Dal Mutto et al. | |
| 8,854,433 B1* | 10/2014 | Rafii | G06F 3/017 348/47 |
| 8,929,612 B2 | 1/2015 | Ambrus et al. | |
| 9,092,665 B2 | 7/2015 | Stoppa et al. | |
| 9,104,271 B1 | 8/2015 | Adams et al. | |
| 9,152,173 B2 | 10/2015 | Lee et al. | |
| 9,864,433 B2 | 1/2018 | Pinault et al. | |
| 10,416,834 B1* | 9/2019 | Holz | G06F 3/011 |
| 2002/0060663 A1 | 5/2002 | Wang | |
| 2005/0031166 A1* | 2/2005 | Fujimura | G06T 7/20 382/103 |
| 2009/0110292 A1* | 4/2009 | Fujimura | G06F 3/017 382/203 |
| 2009/0172606 A1* | 7/2009 | Dunn | G06F 3/038 715/863 |
| 2009/0244309 A1 | 10/2009 | Maison et al. | |
| 2009/0254855 A1 | 10/2009 | Kretz et al. | |
| 2010/0023314 A1 | 1/2010 | Hernandez | |
| 2010/0177039 A1 | 7/2010 | Grant et al. | |
| 2010/0261526 A1 | 10/2010 | Anderson et al. | |
| 2011/0115892 A1 | 5/2011 | Fan | |
| 2011/0119640 A1* | 5/2011 | Berkes | G06F 3/017 715/863 |
| 2011/0197263 A1 | 8/2011 | Stinson, III | |
| 2011/0305398 A1* | 12/2011 | Sakakibara | G06K 9/222 382/203 |
| 2011/0317871 A1* | 12/2011 | Tossell | G06K 9/00342 382/103 |
| 2012/0030568 A1* | 2/2012 | Migos | G06F 3/0486 715/702 |
| 2012/0056804 A1 | 3/2012 | Radivojevic et al. | |
| 2012/0068950 A1* | 3/2012 | Conde | G06F 3/04847 345/173 |
| 2012/0069168 A1 | 3/2012 | Huang | |
| 2012/0099765 A1* | 4/2012 | Zheng | G06K 9/00771 382/103 |
| 2012/0132512 A1 | 5/2012 | Al-Sadah et al. | |
| 2012/0154313 A1* | 6/2012 | Au | G06F 3/04883 345/173 |
| 2012/0163723 A1 | 6/2012 | Balan et al. | |
| 2012/0280897 A1* | 11/2012 | Balan | G06K 9/00355 345/156 |
| 2012/0287044 A1* | 11/2012 | Bell | G06F 3/011 345/158 |
| 2012/0314902 A1 | 12/2012 | Kimura et al. | |
| 2012/0327125 A1* | 12/2012 | Kutliroff | G06F 3/011 345/660 |
| 2013/0033459 A1 | 2/2013 | Guo | |
| 2013/0038623 A1* | 2/2013 | Tezuka | A63F 13/42 345/589 |
| 2013/0104086 A1 | 4/2013 | Mlyniec et al. | |
| 2013/0120250 A1* | 5/2013 | Lin | G06F 3/0304 345/157 |
| 2013/0278504 A1* | 10/2013 | Tong | G06K 9/00355 345/158 |
| 2013/0314341 A1* | 11/2013 | Lee | G06F 3/0481 345/173 |
| 2013/0342671 A1 | 12/2013 | Hummel et al. | |
| 2014/0006997 A1* | 1/2014 | Kim | G06F 3/011 715/773 |
| 2014/0071069 A1* | 3/2014 | Anderson | G06F 3/013 345/173 |
| 2014/0118335 A1 | 5/2014 | Gurman | |
| 2014/0157210 A1* | 6/2014 | Katz | G06F 3/0304 715/863 |
| 2014/0184496 A1* | 7/2014 | Gribetz | G06F 3/013 345/156 |
| 2014/0217178 A1 | 8/2014 | Zhou et al. | |
| 2014/0359536 A1 | 12/2014 | Cheng et al. | |
| 2015/0131852 A1 | 5/2015 | Sweetser et al. | |
| 2015/0153833 A1 | 6/2015 | Pinault et al. | |
| 2015/0199021 A1 | 7/2015 | Jeon et al. | |
| 2016/0253044 A1* | 9/2016 | Katz | G06F 3/04842 345/156 |
| 2016/0320846 A1* | 11/2016 | De Michele | G06F 3/017 |
| 2017/0097687 A1 | 4/2017 | Pinault et al. | |
| 2020/0004403 A1* | 1/2020 | Holz | G06F 3/011 |

FOREIGN PATENT DOCUMENTS

| | | | |
|---|---|---|---|
| CN | 102236409 A | 11/2011 | |
| CN | 102841733 A * | 12/2012 | ......... G06F 3/04883 |
| CN | 102915112 A | 2/2013 | |
| EP | 2474950 A1 | 7/2012 | |
| EP | 2610705 A1 | 7/2013 | |
| EP | 2613223 A1 | 7/2013 | |
| EP | 2680228 A1 | 1/2014 | |
| EP | 2700528 A2 | 2/2014 | |
| JP | 2003-256850 A | 9/2003 | |
| JP | 2006-268212 A | 10/2006 | |
| JP | 2009-042796 A | 2/2009 | |
| JP | 2009-255903 A2 | 11/2009 | |
| JP | 2010-079332 A | 4/2010 | |
| JP | 2010-152791 A | 7/2010 | |
| JP | 2010-541398 A | 12/2010 | |
| JP | 2012-068690 A | 4/2012 | |
| JP | 2012-073658 A | 4/2012 | |
| JP | 2012-160051 A | 8/2012 | |
| JP | 2014-235634 A | 12/2014 | |
| WO | WO 2007/061057 A1 | 5/2007 | |
| WO | WO 2009/042579 A1 | 4/2009 | |
| WO | WO 2009/116285 A1 | 9/2009 | |
| WO | WO 2011-036618 A2 | 3/2011 | |
| WO | 2013/147804 A1 | 10/2013 | |

OTHER PUBLICATIONS

International Preliminary Report on Patentability for International Application No. PCT/EP2013/064860 dated Nov. 11, 2014.
International Search Report and Written Opinion for International Application No. PCT/EP2015/050091 dated Mar. 30, 2015.
International Preliminary Report on Patentability for International Application No. PCT/EP2015/050091 dated Jul. 21, 2016.
Karl, Press release: SoftKinetic Announces World's Smallest HD Gesture Recognition Camera and Releases Far and Close Interaction Middleware. XP055088011. Retrieved from the Internet: URL: http://www.softkinetic-studios.com/Portals/1/Press%20Room/20120605 PRSoftKinetic%20Announces%20World%E2%80%99s%20Smallest%20HD%20Gesture%20Recognition.pdf Jun. 5, 2012 (Jun. 5, 2012). Retrieved on Nov. 13, 2013. Nov. 13, 2013. 2 pages.
International Search Report dated Mar. 30, 2015, issued in corresponding International Application No. PCT/EP2015/050091, filed Jan. 6, 2015, 3 pages.
Written Opinion of the International Searching Authority dated Mar. 30, 2015, issued in corresponding International Application No. PCT/EP2015/050091, filed Jan. 6, 2015, 6 pages.

(56) References Cited

OTHER PUBLICATIONS

Extended International Search Report dated Jun. 13, 2014, issued in priority European Patent Application No. 14150363.1, filed Jan. 7, 2014, 7 pages.
Chinese Office Action and English Translation thereof for Chinese Application No. 201380036563.X dated Nov. 2, 2017.
Japanese Office Action for Japanese Patent Application No. 2015-521026 dated Jan. 30, 2018.
Softkinetic: "From Computex: SoftKinetic announces the DepthSense 325 and iisu 3.5," Jun. 5, 2012, retrieved from the Internet: <https://www.youtube.com/watch?v=8pQ-m4L2oqo>, 1 page.
Softkinetic: "Introducing iisu 3.5," Jun. 29, 2012, retrieved from the Internet: <https://www.youtube.com/watch?v=5LvhdFudp50>, 1 page.
Communication Pursuant to Article 94(3) ECP, dated Jan. 18, 2017, issued in priority European Application No. 14150363.1, filed Jan. 7, 2014, 8 pages.
International Preliminary Report on Patentability and Written Opinion dated Jul. 12, 2016, issued in corresponding International Application No. PCT/EP2015/050091, filed Jan. 6, 2015, 7 pages.
Irie, K., et al., "Construction of an Intelligent Room Using Gesture Recognition," Proceedings of the 21st Academic Lectures of the Robotics Society of Japan, Sep. 20, 2003, 2J15, pp. 1-3.
Office Action dated Oct. 13, 2016, issued in corresponding Japanese Patent Application No. 2016-518540, filed Jan. 6, 2015, 3 pages.
Otsuki, M., et al., "Design and Implementation of a Novel Method Suitable to Separation and Observation of Virtual Objects in 3D Space," Journal of the Virtual Reality Society of Japan 16(2):227-237, Jun. 2011.
Otsuki, M., et al., "Realizing the Spatial Clipping Method for Selecting Digital Objects in 3D Space" [DVD-ROM], Journal of Human Interface Symposium, Sep. 2010, pp. 457-460.
Chinese Office Action and English Translation thereof for Chinese Application No. 201380040827.9 dated Apr. 19, 2018.
[No Author Listed], Review of approaches for bandwidth reduction for low complexity MTC LTE UEs. 3GPP TSG RAN WG1 Meeting #67. Nov. 2011. 5 pages.
Chinese Office Action and English Translation thereof for Chinese Application No. 201580000975.7 dated Nov. 15, 2018.

* cited by examiner

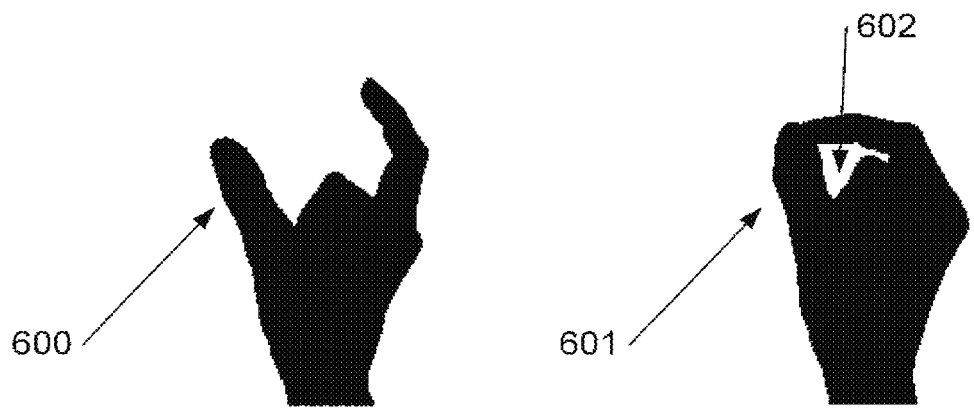
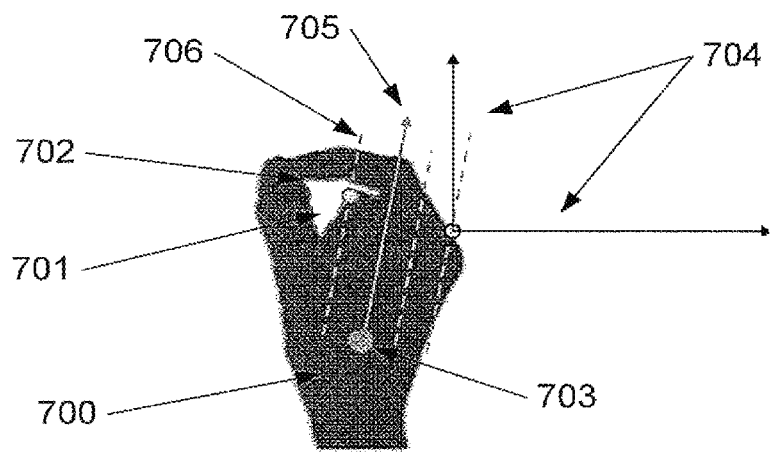
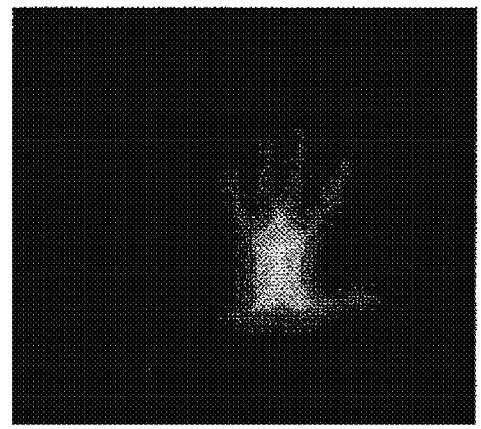
Fig. 6
Fig. 7
Fig. 8

HUMAN-TO-COMPUTER NATURAL THREE-DIMENSIONAL HAND GESTURE BASED NAVIGATION METHOD

CROSS REFERENCE TO RELATED APPLICATIONS

This application claims the benefit under 35 U.S.C. § 371 as a U.S. National Stage Entry of International Application No. PCT/EP2015/050091, filed in the European Patent Office as a Receiving Office on Jan. 6, 2015, which claims priority to European Patent Application Number EP14150363.1, filed in the European Patent Office on Jan. 7, 2014, the entire contents of each of which is hereby incorporated by reference in its entirety.

FIELD OF THE INVENTION

The present invention relates to improvements in or relating to human-to-computer interactions using three-dimensional hand based gesture recognition. The invention is more particularly, although not exclusively, concerned with real-time detection, without any false positives or delay, of particular sequences of intentionally performed natural gestures so as to provide reliable navigation, scrolling and zooming interactions within a conventional graphical user interface despite continuous motion of a freely moving hand having no device system for triggering events.

BACKGROUND OF THE INVENTION

Conventional human-to-computer interfaces include hardware control system interfaces, such as, keyboards, mice, remote control and pointing devices. With such interfaces, a physical action needs to be performed on the hardware device itself, for example, touching, moving, holding, pointing, pressing, moving, clicking, or even a plurality of these actions together, sequentially or simultaneously, in a way enabled by these device interfaces so that control commands, such as, triggered binary events or continuous values, can be sent to a computer system with which the interface is intended to interact.

The computer system often comprises a graphical user interface (GUI) having windows, button and other items or elements which are displayed for providing visual feedback to a user; they are designed in accordance with usability and ergonomics of conventional human-to-computer hardware interfaces. For instance, operating systems have GUI windows which often comprise scroll bars for enabling navigation within content, such as, a map, an image or a text box, the size of which being larger than the one displayed within the area delimited by the size of the display screen size itself. Interaction with the scroll bars is optimised for using a wheel on a mouse hardware device, or by combining motion of the mouse with a holding click action. In addition, conventional GUIs often comprise buttons on which a user clicks with mouse buttons for zooming into and out of the content of the GUI.

Moreover, conventional GUIs also often comprise map navigation GUI interactions which usually require a click combined with a continuous mouse movement to make the map scroll as function of the mouse movement or to change from one map area to the other.

More recently, contactless interaction systems have become available. These systems are based on a device for sequentially capturing images of a scene with respect to time, and, a method for determining gestures performed by a user within the captured scene. Such contactless interactions systems are intended to be used in combination with existing hardware interfaces, or, optionally, alone by triggering the same control commands as conventional hardware interfaces but from recognised gestures within the sequentially captured images of the scene.

In US-A-2011/0115892, a conventional two-dimensional (2D) camera is used for capturing light in the visible spectrum and for detecting, in a 2D image, a finger of a user from which a gesture may be recognised. The gesture may be used for interacting with a computerised system. However, the intrinsic limitations of conventional 2D imaging techniques, and, more particularly the intrinsic limitations of the imaging system, make detection and recognition of objects unreliable in an environment having varying illumination. For instance, finger-like objects, such as, pens, may be incorrectly identified or detected as fingers due to the technique used, or the tracking of a finger within the sequentially captured images may be lost due to the dependency of image quality with respect to the scene illumination.

Advanced 2D imaging processing techniques make it possible to use a conventional 2D colour camera for making an acceptable detection of a hand of a user and for providing very simple hand gesture based interactions from the detection and analysis of some hand parameters and their motion. In particular, state of the art automatic exposure techniques combined with 2D background learning techniques and subsequent background removal processing, provide a more efficient extraction a foreground object of interest from the scene, the scene being segmented into clusters from which object recognition may be performed. In this way, a hand of a user may be extracted from a 2D colour image with some relative robustness due to skin colour detection and shape features, and basic gesture recognition can be performed. However, it is still not possible to analyse efficiently and accurately freely moving user parts (for example, a hand) in a real 3D environment as the distance of the user parts to the imaging device may vary significantly and their representation in the 2D captured image may consequently become inconsistent.

US-A-2011/197263 discloses a system and a method for providing a spatial-input-based multi-user shared display session which rely on matching and comparing hand reference points with reference hand configurations. Detected parts of a hand may be compared with reference hand object models stored in hand reference data store to identify matching hand parts, to connect hand parts together, to generate a vector of hand reference points, and to identify a matching hand configuration. The vector of hand reference points may be compared with reference hand configurations stored in hand reference data stores to identify a matching hand configuration.

US-A-2013/278504 discloses a hand detection system in which a bounding box is effectively provided around the hand. Shape features associated with the hand, for example, eccentricity, compactness, orientation, rectangularity, width centre, height centre, minimum box angle, minimum box width, the number of defects, the difference between left and right portions of the bounding box, and/or the difference between top and bottom portions of the bounding box, are input to a gesture identification module for comparison with data stored within the system.

CN-A-102 236 409 discloses a hand detection system in which, once the hand has been identified in an input image using edge detection, the hand is tracked to determine if pre-set start and stop gestures have been performed. The determination of the gesture is based on the number of fingers which are visible in the hand.

In US-A-2012/0069168, colour information is used to find different hand related data or hand parameters, such as, the palm centre and the base of the palm, as well as, distances of pixels from the palm centre to a contour or extremities of the hand using a mask of the hand extracted from the scene. These distances can even be used to assess whether the hand is closed or open, and, from that assessment, it can be determined if the hand is performing an object "selection" gesture. However, such gesture-based methods have limitations and therefore cannot provide a robust solution, providing efficient real-time processing, on low-end platforms for resolving 3D pointing like interactions with a computer nor can such methods be operated in a dark environment in which colours may not be distinguishable. Moreover, the "selection" gesture detected is not accurate since there is no real objective distance and size measurements. "Pointing" and "selecting" a virtual object accurately at various distances from the imaging device is therefore uncertain. Furthermore, such a solution cannot be used to support a high reliability level requirement, such as, support of varying orientation of the hand in 3D space, nor finger-based 3D gestures.

If 2D image capture solutions suffer from strong unrecoverable limitations for enabling robust and efficient hand gesture recognition in any situation or environment, it is accepted they are, as a consequence, not appropriate for enabling further derived signal processing methods which provide reliable control commands or reliable related human-to-computer interactions.

However, information relating to a third dimension, namely, the depth, is data made recently available by some new range sensing camera systems; the 3D cameras. One advantage of those 3D cameras or 3D imaging systems is the ability to provide more precisely absolute distance metric information enabling, in particular, improved detection recognition and tracking of, for instance, a hand of a user, and of parameters related to the hand. This third dimension further enables determining 3D position and/or 3D postures in space, including static and/or dynamic gestures, such as, for example, in EP-A-2613223, where a method is disclosed which comprises the determination, typically at long range distances (for example, about 3 m), within a clustered depth map comprising a user, of at least one cluster corresponding to an extremity of a part of the user, that is, a hand, and of at least one of: a hand push gesture; a hand click gesture; a hand pull gesture; a hand swipe gesture; a hand circle gesture; or simply a hand 3D position-based pointing gesture. Gestures are predetermined and recognised in a delimited area of the 3D space in which the hand or extremity performing an unambiguous coherent movement has been detected.

Moreover, such range imaging systems (3D cameras) may providing their own illumination and are thus able to operate in the infrared spectrum instead of the visible spectrum. Such range sensing systems, for instance, time-of-flight (TOF) 3D cameras, provide 3D information which, by the way, open up the possibility of having a more robust, stable, reliable and accurate detection of parts of a user parts (for example, the hands) as scene capture is no longer dependent on the natural illumination of the scene. In addition, the provision of absolute size of objects and distance measurements breaks the computational power dependency (real-time requirement aspect) to the distance of the objects of interest (that is, the hands) from the image sensing device.

Some image processing methods addressing measurement in real-time of 3D dimensions and 3D positions of the hand, and, associated hand-based 3D gesture recognition techniques, are now progressively being adapted for using data provided by the 3D cameras. Such methods use at least the depth information, and, optionally, at least one of a colour image and a greyscale confidence image corresponding to the illumination level of the scene.

Despite growing prior art in the domain of 3D hand-based gesture recognition, obtaining an accurate, efficient (that is, no delay with limited processing power requirements), robust and reliable (that is, without false positive gesture detection) system from data provided by range imaging systems is still a challenge. Finger-based gesture recognition is a novel domain. This is due to complexity of the problem which requires the combination of: novel detection and tracking techniques of a hand and/or of the fingers of a user on which gesture recognition techniques may be applied; novel gesture recognition techniques themselves; and novel or adapted human-to-computer interactions.

In particular, a first issue is that 3D hand gesture recognition based interactions are currently mostly used as human-to-computer interfaces (HCIs) for GUIs designed for touch-based interactions or mouse device based interactions requiring further commands, such as, event triggers combined with continuous control values. As hand movement is effectively a continuous phenomenon, a second issue occurs when trying to use 3D hand gesture recognition systems with conventional GUIs together with the ability to distinguish between an intentional interaction and non-intentional interactions. Even more particularly, a third and intrinsic issue is to be able to determine within the continuous motion of at least one single hand, a precise and reliable detection of beginning (start) and ending (stop) of a predetermined natural gesture in an environment in which the user is freely moving.

This is even more problematic when the gestures preferably need to be natural, intuitive, very easy to perform, and, as the hand intrinsically do not comprises any button, wheel or any specifically designed actuator which can be used to trigger an event indicating when a control gesture (or interaction) may start and stop.

One consequence is that it is nearly impossible to take control intuitively, without delay, of one button of a conventional GUI, nor to use easily existing 3D hand-based gesture recognition systems which comprise, at best, an open-close status for natural, accurate, fast and simple up-down and left-right scrolling within a GUI, such as, in a map, in a GUI of an application having scrollbars to be controlled, or in GUI having a plurality of windows which may be accessed by way of a simple gesture which is clearly and reliably recognisable and repeatable.

The present invention described herein provides a solution to these issues.

SUMMARY OF THE INVENTION

In accordance with one aspect of the present invention, there is provided a method for providing natural human-to-computer interactions using a three-dimensional hand gesture based recognition system, the method comprising the steps of:—
  a) determining at least two points of interest in a hand of a user;
  b) recognising natural gestures performed by said at least two points of interest comprising:— b1) recognising a first natural gesture corresponding to a three-dimensional hand pose to trigger the beginning of a human-to-computer interaction by determining when two points of interest in three-dimensional space move close to one another, the distance between the two points of interest being below a predetermined threshold value;

b2) recognising a second natural gesture from movements of at least one point of interest of the hand to control a continuous human-to-computer interaction, the human-to-computer interaction being controlled as long as said first three-dimensional hand pose lasts; and b3) recognising a third natural gesture to trigger termination of the human-to-computer interaction, the third natural gesture being determined as soon as said first three-dimensional hand pose is released; and c) interacting with a graphical user interface using a sequence of said first, second and third natural gestures performed by said points of interest.

By detecting a specific occurrence of subsequent three-dimensional hand poses in time, it is possible to determine whether a natural hand movement is intentional or non-intentional, that is, whether a control gesture is intentional or non-intentional, and when it starts and when it stops.

By detecting and determining a first three-dimensional gesture corresponding to a three-dimensional hand pose using at least two points of interest, and, controlling a human-to-computer interaction as long as said first three-dimensional hand pose lasts, it is possible to detect and determine a second subsequent three-dimensional gesture which correspond to a continuous interaction. The release of said first three-dimensional hand pose (i.e. the three-dimensional gesture that triggered the start event) triggering detection of third three-dimensional gesture corresponding to a stop event, meaning the stop of said second subsequent three-dimensional continuous interaction.

Additionally, by detecting the presence of a hole within the first three-dimensional gesture corresponding to a three-dimensional hand pose and its subsequent removal in the third three-dimensional gesture corresponding to the release of the first three-dimensional hand pose, it is possible to determine with better robustness whether a hand movement is intentional or non-intentional. This provides precise and reliable detection of the three main phases of a sequence of natural three-dimensional hand gestures used for human-to-computer interaction, namely, the initiation of a human-to-computer interaction, the human-to-computer interaction itself, and an end to the human-to-computer interaction.

The present invention, in a first aspect, relates to a method for determining parameters and points of interest (POIs) in a hand of a user, those POIs including but being not limited to the finger tips. The determination of the parameters uses as input a clustered 3D point cloud (or a clustered depth map) captured by a 3D range finding imaging system. The detection is made possible regardless of the 3D position, pose, motion and orientation of at least one hand.

The present invention, more particularly, concerns the detection and tracking of hand POIs characterised in that they comprises at least two POIs among the hand tip, the finger tips (that is, hand and finger extremities), the hand palm centre and a POI determined using the plurality of other POIs among the extremities and the palm centre, two of these POIs being selected and tracked for enabling detection of at least one of a reliable finger tips based "pinching" 3D gesture, a reliable finger tip based "clicking" 3D gesture and a hand tip "grabbing" 3D gesture, and one of these POIs being selected and tracked for enabling hand based 3D "pointing" gesture (or interaction gesture).

The invention, in a second aspect, relates to a method for determining when a predetermined 3D gesture among the finger tips based "pinching", the finger tips based "clicking" and the hand based "grabbing" gestures occurred and have been released, and for determining continuous control commands from the hand based "pointing" 3D gesture (or interaction gesture).

The invention, in a third aspect, relates to a 3D hand gesture based human to computer interaction process for controlling the scrolling, zooming and navigation features of a graphical user interface by using the hand based continuous "pointing" gesture (or interaction gesture) in combination with the sequential detection of "beginning" and "ending" interactions events which are determined from detection of occurrence and release of one of the reliable finger tip based "pinching" 3D gesture, the reliable finger tip based "clicking" 3D gesture and the hand tip "grabbing" 3D gesture.

In one advantageous embodiment, the present invention provides natural human-to-computer interactions using a three-dimensional hand and finger 3D gestures based recognition system, the method being characterised in that a first predetermined 3D gesture (start event) triggers the beginning of a predetermined human-to-computer interaction, a second subsequent (continuous interaction) 3D gesture controls the human to computer interaction, the second (interaction) 3D gesture elapsing when a third predetermined 3D gesture (stop event) is recognised.

In one embodiment, step b2) is performed subsequent to step b1) and comprises detecting and tracking a continuous change in position of at least one point of interest. This detection and tracking of a continuous change is position may comprise detecting and tracking a change in 3D position of at least one POI within a hand.

In one preferred embodiment, steps b1) and b3) comprise using points of interest that are different to those used for step b2). In this case, the predetermined 3D gestures corresponding to the first and third (start and stop events) are recognised from the analysis of hand POIs different from those used for determining the second subsequent (interaction) 3D gesture.

More advantageously, once the predetermined 3D (start event) gesture is recognised, an on-screen pointer representation of at least one POI is locked with at least one of: a pointed movable element in a graphical user interface at which it is pointing, and the position in a displayed graphical user interface to which it is pointing, and once the (stop event) predetermined 3D gesture is recognised the on-screen representation is unlocked from the position or element in the graphical user interface to which it is locked.

The terms "locked" or "locking" as used herein refer to the association of the pointer with the moveable element of the graphical user interface. The corresponding graphical representation is attached to the location in space of said moveable element of the graphical user interface until detection of the stop event which unlocks it enabling it to move freely within the entire GUI.

The terms "unlocked" or "unlocking" as used herein refer to the disassociation of the point with the moveable element of the graphical user interface.

Even more advantageously, when the on-screen representation of at least one pointer is locked, the second subsequent (continuous interaction) 3D gesture causes the change in position of the graphical user interface element with which the pointer is locked relative to the 3D position of the point of interest in the hand controlling the (continuous interaction) gesture.

Preferably, the (start event) and (stop event) predetermined 3D gestures are the occurrence and respectively release of one of an open/close hand 3D gesture, a finger tip based "clicking" 3D gesture, a finger tip based "pinching" 3D gesture, a hand tip based "grabbing" 3D gesture.

More preferably, the change in position of the POI used as the second (continuous interaction) 3D gesture input to control at least one of: a scrolling of a graphical user interface, a zooming effect on the graphical user interface, a scrolling of an element associated with a graphical user interface, and a change of a graphical user interface.

Even more preferably, the hand gesture recognitions are performed using POI determined on a user's hand by at least one of a three-dimensional hand skeleton modelling technique, a three-dimensional hand tips and parameters detection technique.

Advantageously, the three subsequent (start, interaction, stop) natural gestures are performed using at least one single hand, In one another embodiment, detecting and tracking a change in position of at least one POI determined in a hand is performed onto another hand than the one from which the start and stop event are triggered.

In one another embodiment, the interaction is a graphical user interface windows change relatively to the subsequent second (continuous interaction) 3D gesture; the appearing windows being selected as function of the direction of said second subsequent natural gesture and if said second subsequent natural gesture comprises a change in position of the point of interest higher than a predetermined threshold.

Other detailed features of the present invention are defined by the appended claims and supported in the description below.

BRIEF DESCRIPTION OF THE DRAWINGS

For a better understanding of the present invention, reference will now be made, by way of example, to the accompanying drawings in which:

FIG. 6 illustrates a two-dimensional perspective of two steps in performing a finger tip based "pinching" three-dimensional gesture;

FIG. 7 illustrates a two-dimensional perspective of a finger tip based "pinching" three-dimensional gesture and showing vicinity lines projected from hand palm centre in the direction of the hand, and onto which orthogonal rays are associated for enabling hole detection; and FIG. 8 illustrates a distance map used for approximating hand palm centre.

DESCRIPTION OF THE INVENTION

Figure 1:
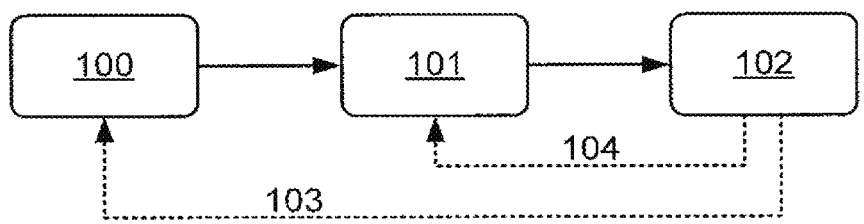
FIG. 1 illustrates a flow diagram of the three main processing steps of the method in accordance with the present invention.

The present invention relates to hand and finger based three-dimensional (3D) natural gesture interactions for controlling conventional graphical user interfaces (GUIs) using efficient, robust, hand parameters based 3D gestures recognition techniques. It addresses, in particular, navigation, zooming and scrolling features in GUIs originally designed for mice and touch gesture interactions on the basis of one single method which is 3D gesture-based. It moreover fits perfectly with close range gesture based interactions, such as, automotive infotainment (information/entertainment) system controls, personal computer system controls, tablets, smartphones and other embedded computer controls.

The invention herein will be described with respect to specific embodiments and with reference to certain drawings but man of the art will acknowledge the invention is not limited thereto. The drawings described are only schematic and are non-limiting. In the drawings, the size of some of the elements may be exaggerated and not drawn on scale for illustrative purposes. In addition, the particular orientations of the Figures as described below are not limiting but are shown by way of example.

The terms "natural interaction" or "natural 3D gesture-based interaction" as used herein refer to human-to-computer interactions in which the human does not have to handle, carry or use any hardware device or marker, and wherein the interactive computer system is associated with imaging means, such as, a range finding imaging system like a 3D time-of-flight (TOF) camera for capturing and extracting, using the computational means, information provided by user hand movements to intuitively control the computer, the information being preferably in the form of a predetermined set of 3D natural gestures.

The terms "virtual representation" and "representation" as used herein correspond to the digital representation in a virtual world or in a GUI of an interacting object. This interacting object may be an object from the virtual world itself, for example, a folder from the GUI of an operating system with which a user may interact. This interacting object may also be a digital representation in a virtual world of a real interacting object from the real world, for example, a pointer representation associated with a hand of a user the position of which is tracked over the time to enable pointing or mouse pointing interactions with the GUI of an operating system.

The term "hand parameters" as used herein refers to at least the following parameters relating to the hand: the hand and finger tips, the centre of the palm (termed "palm centre"); the radius of the palm (termed "palm radius"), the normal to the palm (termed as "palm normal"), the openness of the palm (termed "palm openness" or "hand open-close status"), the base of the palm, and the distance from the palm centre to the hand contour.

The terms "singular point of interest" or "singular points of interest" as used herein refer to singular points on a hand of a user, namely: extremities of the hand; finger tips; hand tips; the centre of mass of the hand; the palm centre; or any other point the position of which can be determined using the position of at least one of the other reliable points obtained from the hand and which can be tracked with respect to time.

The terms "point of interest" or "points of interest" are referred hereinafter generally as "POI" and "POIs" respectively.

The term "hand tip" as used herein refers to a single POI which corresponds to the main extremity of the hand. It may be more particularly located at an average position close to the extremities of the fingers.

The term "finger tips" as used herein refers to several positions in space representing each individual finger tip, or finger extremity. Each individual finger tip is typically considered to be a singular POI or a POI.

The terms "pointer" or "pointers" as used herein refer to a representation on a display screen of a POI or a set of selected POI.

The terms "pose" or "posture" as used herein refer to the physical hand posture at a particular instant in time. This corresponds to a particular arrangement in space of the positions of a set of specific POIs of the hand, and in particular, to the arrangement in space of the POIs corresponding to the finger tip with respect to each other and with respect to the palm centre.

The term "gesture" or "3D gesture" as used herein refers to a change in the arrangement in space of a POI or a set of POIs with respect to time. In addition or alternatively, the term "gesture" may also refer to a change in the position of an unchanged arrangement of the POIs in space (pose) with respect to time. If the pose does not change with respect to time, that is, the arrangement of POI within space remains unchanged, it is described as a static gesture. If the arrangement of POI remains unchanged and the position of the arrangement changes within space with respect to time, this is described as a dynamic gesture having static pose. If the arrangement of POI changes with respect to time, this is described as a dynamic gesture having different poses.

The term "pointing" as used herein refers to a "pointing gesture". It corresponds to, for example, using at least one of the hand tips, or the associated POI, as a real world user related reference 3D position, that is, a position in space corresponding to an extremity, which can be used for determining, in virtual space, the position at which a virtual representation of a pointer is located. The determination of the position of the virtual representation of the pointer can be achieved according to several methods including, for example, using the absolute positioning of a user POI in the real world 3D space, using the relative positioning of a user POI in the real world 3D space with respect to a determined reference 3D position, or using a relative positioning determined by the principal direction of a vector set in between two POI, for example, the direction defined by the vector from the palm centre to the index finger-tip or the direction defined by the vector from an eye to one of the POIs corresponding to a hand extremity, for example the index finger-tip. It will be appreciated that "pointing" may additionally make use of several pointers, including, for example, using a statistical mode of the positions of at least two POIs. The statistical mode may be, for example, at least one of: the mean; the median; the maximum; the minimum or a weighted sum of their positions.

The term "interaction 3D gesture" as used herein refers to a continuous gesture, such as, preferably a "pointing" gesture using relative positioning of a POI with respect to a position in space for controlling the interaction enabled by the computer interface, for instance, controlling a pointer or a scroll bar.

The terms "start 3D gesture" (start event) and "stop 3D gesture" (stop event) as used herein refers to events occurring at the time when one predetermined natural 3D gesture is recognised as being performed, or respectively released The terms "grabbing", "pinching", and "clicking" gestures as used herein refers to 3D natural gestures performed using hand parameters, preferably for triggering start or stop gesture based events from motion and pose analysis of at least two POIs.

The "pinching" gesture, with respect to ergonomics considerations, refers to the closing of the hand so that at least two POIs chosen from among those of the finger tips, are made to become closer together up to entering into contact with one another. Distance or relative distance in between the two POIs may additionally be used for determining a value associated with the level or amount of the "pinching" gesture. The "pinching gesture" comprises preferably the use of the thumb finger tip POI and the index finger tip POI. The "pinching" gesture detection may be improved by additionally detecting availability of a hole, within one preferred perspective, if available, within the shape of the hand.

The "grabbing gesture" is a variation of the "pinching gesture" wherein the first POI is the thumb finger tip and the second POI is the hand tip.

The "clicking gesture" is a gesture characterised in that it corresponds to a sporadic event, such as, the detection of a hand pose that is maintained for a very short period of time, the duration of which may be determined as function of a time delay threshold. The "clicking gesture" more precisely corresponds to the previously described "pinching" and "grabbing" gestures characterised in that the contact between the two POIs considered is maintained for very short periods of time, with a duration lower than the predetermined time delay threshold, but is not limited hereto. The "clicking gesture" may alternatively also be performed with one single POI, for example, the index finger tip or the hand tip, oscillating rapidly once up and down with respect to the two main axes of the hand (as determined by a principal component analysis (PCA)) within a predetermined distance and within a predetermined period of time.

The present invention relates generally to a method for providing improved contactless natural human-to-computer interactions, and, more particularly, to a method for controlling GUIs using 3D gestures to be intuitively and easily performed sequentially. The gestures are executed in space by hand movements of a user captured sequentially with respect to time by a range imaging system, such as, a 3D camera associated with a computer system. The computer system, the 3D camera, and the GUI, operating in accordance with the method described herein, form a contactless natural human-to-computer interaction system. Positioning of the user with respect to the range finding camera device is not of importance as long as the interacting hand and the POI of that hand can be imaged onto the imaging sensor of the range finding camera device.

In accordance with the present invention, hand gesture information are extracted from data provided by the range finding camera device, that data being in the form of a depth map or of a 3D point cloud (also termed a set of vertices) that comprises at least a depth measurement per pixel, and, optionally scene illumination and/or colour information.

According to an embodiment of the present invention, FIG. 1 illustrates a flow diagram of the three main processing steps of the method, namely, a first step (step 100) wherein interacting hand parameters are detected, identified and tracked over the time to define relevant POIs, a second step (step 101) wherein 3D gestures are recognised from the movement and pose of the relevant POIs being considered, and a third step (step 102) wherein a set of predetermined recognised 3D gestures from step (101) are used for controlling the interaction with a GUI. The control of the interaction with the GUI may further comprises a feedback loop (103) that may change the number or the Identification of the POIs to be detected in step (100), or another feedback loop (104) that may change the number.

The first step, step 100, aims at detecting, identifying and tracking, a set of hand parameters, from which several relevant POI, namely, the singular POI or the POI, will be selected for determining 3D gestures and enabling the further interaction with the GUI. The hand parameters may preferably, but not exclusively, include the hand tips, that is, the hand tip and the finger tips, so as to be able to provide at least one stable and reliable POI, and preferably two. Additionally, step 100 may also comprise the determination of at least one of the following parameters: the palm radius; the hand openness; and the palm normal. Moreover, using at least one reliable POI from those determined hand parameters, the method further comprises determining at least one POI for being associated with a pointer interacting within the GUI.

The first step of the present invention uses input information in the form of a depth map or a corresponding 3D point cloud (that is, a set of vertices) comprising at least one hand of a user. The depth map is segmented into several clusters in accordance with a method known in the art, each of the clusters being labelled accordingly. The label(s) corresponding to the identified hand(s) to be used is also provided. The interacting hand may be arbitrary determined (for example, a choice of one of the hands, the left hand), or automatically from its position in space or its movements (for example, a labelled hand demonstrating motion can be selected). Notably, only the labelled 3D points corresponding to the interacting hand will be considered in the following processing steps.

In one first aspect, step 100 may first comprise the detection and determination of the palm centre of the hand which requires a prior computation of "a distance transform" the output of which is a distance map of the identified hand to be used. The detection of the palm centre is not mandatory, but it is however an advantageous mode for providing a relatively stable POI to be used as reference for pointing gesture interactions. The distance map of the hand is an image in which each pixel of the hand has a value equal to the distance in a real world metric system to the closest border of the hand, such as illustrated in FIG. 8, where the labelled hand to be used is segmented from any other useless labelled parts of the user and from the background. In the Illustration, the darker the content of each pixel in the hand representation, the farther this pixel is away from the centre of the labelled hand. Such a distance map image may be computed using two passes on the binary label image of the hand. Several methods may be used for performing the distance transform. However, one important point in the present invention is that the distance value obtained for each pixel can be related to a metric distance in the real world since each pixel of the label image corresponds to a position in the 3D point cloud, and, as each distance in the distance map corresponds to a distance metric in the real world. For example, the distance transform may be performed using a two-pass process in which the first pass is from the top-left corner to bottom-right corner of the binary label image, and the second pass is in the opposite direction. For each pass, distances are accumulated for each pixel which correspond to the sum of the minimum values of all of the direct neighbouring pixels already processed by the pass. For instance, in the first pass the direct neighbour for a pixel may be the pixel to the left, to the diagonal left, to the top and to the diagonal right. The distance determined for the current pixel may be determined as being the minimum value of the four neighbouring pixels plus one. Furthermore, to account for basic geometrical properties of the pixels, the value of horizontal/vertical neighbouring pixels may be weighted by a predetermined factor, for example, by a value of 5, while those of the diagonal neighbouring pixels may be weighted by another predetermined weighting factor, for example, by a value of 7. The 7/5 ratio corresponds to a preserving ratio between a diagonal and a side of a typical square pixel ($7/5=1.4 \cong \sqrt{2}$). The use of such a ratio is a preferred embodiment in computing optimisation as root square computations are requiring much more processing unit resources. Moreover, for obtaining improved processing efficiency, a limited portion of the entire depth map is to be processed the boundary of which is defined by maximum and minimum, left, right, top and down positions of the labelled 3D pints corresponding to the considered hand in the depth map. In order to approximate the palm centre position, the process then comprises at least determining the pixel location at which the distance information intensity is the maximum value of all other of the pixels of the hand, and, in a preferred embodiment, minimising the distance to the previously determined palm centre may be considered for enabling smooth changes in position of the previously determined palm centre position. 3D Stabilisation techniques from the art may additionally be used to refine the so approximated palm centre position.

Step 100, in another aspect, also comprises the detection and determination of the 3D position of the hand tip using, for example, PCA performed over the 3D point cloud of the hand. Using a 3D vector, the origin of which is set as being the centre of the palm, and the direction of which is set as being the principal direction given by the PCA, a histogram is computed so that to count, for each section of the vector defining the principal direction of the hand, the number of pixels (or 3D points) from that principal vector axis to the border of the hand, according to the direction of another vector orthogonal to principal direction.

Each section of the vector representing the principal direction may be represented, for example, by a distance metric of 1 mm step. The orthogonal vector to principal direction may be selected arbitrary from the second main direction of the hand obtained by the PCA, with respect to the geometry of the camera position versus the principal direction of the hand so that to maximise the angle formed by the planes respectively formed by two predetermined axis of the camera coordinate system and two axis formed by the two main directions of the hand, or by selecting the orthonormal direction for which the generated histogram demonstrates the highest energy (that is, the point where the integral value is the highest). Using the so determined histogram, the hand tip may then be determined as being the area corresponding to the section of the principal vector for which the minimum number of hand pixels has been projected. In one preferred embodiment, a range between two predetermined threshold values may be defined, for example, a 95% to 99% range, corresponding to the section of the histogram having the less projected pixels, and thus corresponding to the thickest section of the hand along the principal direction of the hand in space which is determined as being the hand tip. 3D stabilisation techniques known in the art may additionally be used to refine the approximated hand tip position.

Step 100 comprises then the detection and determination of the 3D positions of the hand tips irrespective of the hand pose in the input depth map 301 (as will be described below with reference to FIG. 3a). The hand tips comprise areas corresponding to the extremities of the hand and approximating the finger tips. To complete such a detection, a "response image" 302 may be determined (as will be described below with reference to FIG. 3b). In the response image, the value of a pixel represents the difference in depth between each considered pixel and its eight neighbours with respect to the reference 3D coordinate system into which 3D points are represented. A high value indicates a high probability of being an extremity. The value for each pixel (3D point) is computed from eight neighbours along the common eight directions (that is, up, up-left, right, down-right, down, down-left, left, up-left). In each direction, the pixel (3D point) that is at a distance of 2 cm of the current point is considered. To find out to which pixel corresponds a projection of a distance of 2 cm in each direction, the specification of the imaging device or camera is used together with the depth value of the current point, or simply determined using the reference 3D coordinate system. This operation is, of course, only done for valid pixels, that is, pixels (3D points) having a confidence value higher than a predetermined threshold, the confidence value representing the amount of infrared (IR) illumination received at the pixel. For those eight pixels, a difference in 3D position with the current pixel is determined, and the value of the current pixel is taken to be the third smallest value. For instance, in one embodiment corresponding to FIGS. 3a and 3b when the hand is facing the camera, the difference in 3D position will mostly corresponds to a difference in depth. The third smallest value is chosen because it is easy for any non-extremity to have a large value by not being connected on one side (for example, the side of the palm) and it is desired that those parts of the hand do not provide a response as a finger. Yet even a finger can have some direction in which they are connected to the hand. For this reason, the two directions with the two smallest response values are ignored. It is noted that some hand poses may not provide proper response for each physical extremity of the hand, for example, a closed first will provide one single response corresponding to the hand tips. The present invention is however not impacted by such a possibility as interactions are designed for relying on a set of predetermined gestures in which two POIs (or extremities) are available, and where a "pointing" gesture, if any, may be performed from the estimated POI position of the palm centre.

Furthermore, based on the response image and the depth map image, a connected component image may be determined. This corresponds to a label image which enables setting the same label to two adjacent pixels (or 3D points) if, and only if, they both have a positive response value in the response image, that is, they are extremities, and they are close enough in depth (for example, within 1 cm). In other words, two neighbouring pixels (or 3D points) will not have the same label if they have a distance value difference, for example, a depth difference according to FIG. 3, greater than a predetermined threshold, for example 1 cm, or if one of them does not have a positive response value in the extremity response image. This image may then be used for two purposes: the first is to allow grouping extremity responses together to form finger tip candidates as the sole hand extremities are the finger tips; and secondly to remove unwanted small responses from the image. In particular, if a component size is smaller than a predetermined threshold, for example 1 cm, it may be rejected.

The method of the present invention comprises further determining the POI by selecting at least one of the previously determined hand parameters among, the palm centre, the hand tip, a finger tip, or a point the position of which is interpolated from a combination of the positions of these parameters. Preferably, two POIs have to be determined in accordance with specific interactions of the present invention. The number or identification of the POIs may be set by the feedback loop 103 controlled by the interaction required by the GUI. In particular, determining POIs requires to use the labelled responses corresponding to the hand tips. This may be achieved by computing a weighting value for each labelled hand tip response (namely, the component) in the response image based on distance to one to the others (the more isolated the component, the larger the weight is). This way, preselecting at least two POIs may simply be performed by selecting the two components having the two largest weights.

In one preferred embodiment of the present invention, a centre point from among all the component in the response image may be determined. If a simple weighted sum of all the 3D points of the hand components would be taken as the weighting means, the centre point obtained would be biased toward the upper part of the hand since there are more fingers visible and thus stronger responses will be obtained in the upper region than in the lower region where the sole thumb tip response is located. To avoid this issue, the weighting of each component is refined according to the identification of the component to which the response belongs. If a component is far from all the other components (for example, the component corresponding to the thumb fingertip), it will have a larger weighting, and if it is close to the other components (for example, the finger tip), it will have a smaller weighting. This ensures that an isolated finger (in most cases, the thumb) gets a higher weighting than the rest of the fingers when they are visible. This also ensures a more robust identification of the thumb finger tip or tip of the thumb compared to at least the hand tip, and/or the other finger tips which individually can be themselves identified with respect to their position versus said thumb finger and/versus palm centre position and hand main directions obtained from the PCA.

To this end, the distance in between the component may be normalised by the hand span which is computed as the hand radius multiplied by, for example, a predetermined factor of 5. A centre point of all the extremities is computed as a weighted sum using the previously defined component weighting. Once the centre point has been determined, it is used to distinguish the component in the 3D Cartesian space. To do so, a plane passing through the determined centre point and the hand palm centre is used. Since the goal is to have, preferably, the thumb on one side of the plane and the other fingers on the other side, the orientation of the plane with respect to the axis formed by the centre point and the hand palm centre may continuously be determined as simultaneously maximising the distance of the centre points of the two main components to the plane. Given the so determined plane, points of the hand may then easily be sorted according to their side of the plane. Moreover, according to the number of available components detected, their respective size and position, it will be possible to determine accurately the identity of the available component that may be; the thumb fingertip component, the hand tip component, or at least one of the other fingertip component. Selecting two "POIs" can then be executed according to the identification of the components that are needed for the interaction and which may be provided by the feedback loop in step (103).

In addition, if the present invention requires detecting and tracking two POIs for recognising natural 3D gestures, one single POI may be enough if the 3D gesture is to be a "pointing" interaction gesture. Such single POI may be set as being the hand palm centre. In a preferred embodiment, having determined two "POIs", a first POI being a thumb finger tip POI and the second POI being one of the hand tip POI or one another finger tip POI such as the index finger tip POI, an additional stable virtual POI. in between the two POI may be computed from an interpolation technique known in the art. The virtual POI may be the centre of the "POIs" adjusted by the movement of the palm centre and used for enabling "pointing gestures".

Figure 2:
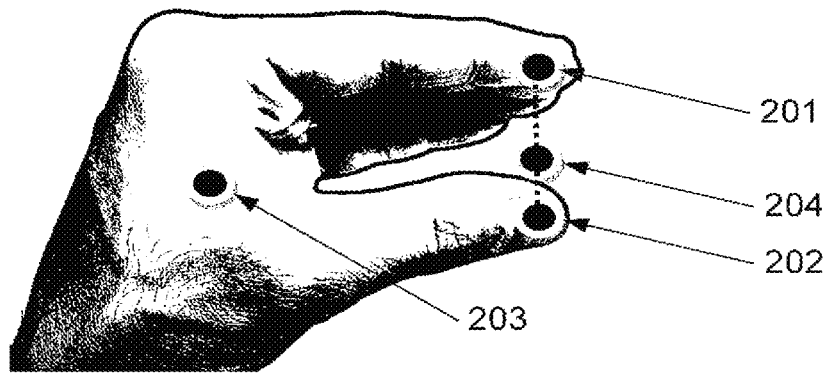
FIG. 2 illustrates a side view of a hand in a hand based "grabbing" posture with POIs relating to the positions of the hand palm centre, the thumb finger tip and the hand tip, and an interpolated POI from the other POIs as determined by the present invention.

In FIG. 2, a side view of the hand in a "grabbing" posture is shown overlaid with the positioning of the hand tip POI 201, the thumb finger tip POI 202, the palm centre POI 203, and the positioning of an additional stable virtual POI 204, the position of which being computed using the other aforementioned POI. In particular, the position of this virtual POI may be updated only if the palm centre has moved more than a predetermined distance, for example, 3 mm. This guarantees one advantageous aspect of the present invention, that is, a user will feel the interaction (that is, pointing) naturally and comfortably with his/her fingers tips even if he/she has to perform "pinching gestures", "clicking gestures" or "grabbing gestures" at the same time. Furthermore, by associating the movements of the virtual POI with those of the palm centre, this guarantees that the pointer associated with the virtual POI will not move when the hand will not move irrespective of noise, jitter or small finger movements. In addition, to avoid jitter in the position of the virtual POI, this process may not binary, that is, start or stop, but instead may be smoothed from movements of the hand palm centre in the range of between 0 and 3 mm by a simple linear regression between the centre of the newly detected position of the virtual POI and the virtual POI position in the previous frame. A 3D stabilisation technique known in the art may preferably be used to refine the so approximated POI position.

Figures 3A, 3B:
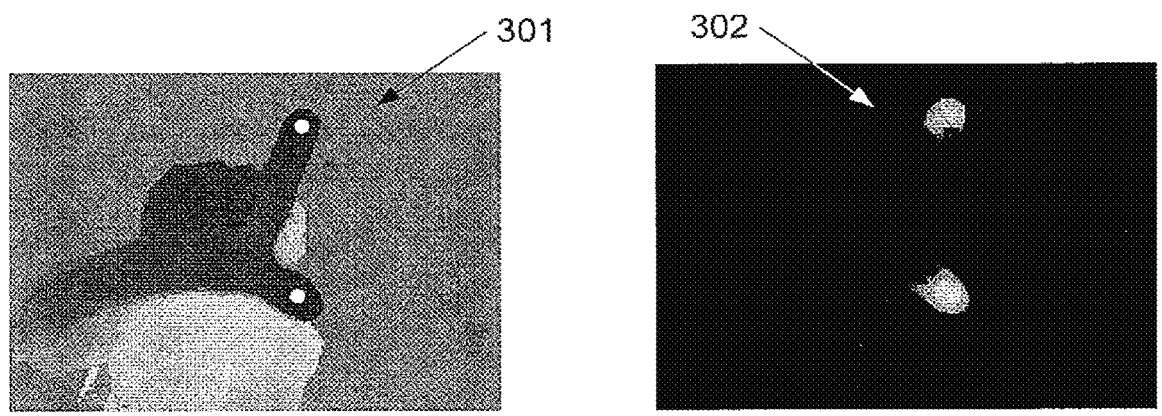
FIGS. 3a and 3b illustrate respectively a depth map of a hand assuming an open "pinching" pose and the corresponding response map.

In FIG. 3a, a front view depth map 301 of a hand assuming an open or released "pinching" pose is shown. Here, the POI corresponding to the tips of the index finger and the thumb are shown. FIG. 3b illustrates the response map 302 corresponding to the depth map shown in FIG. 3a. As can be seen, the response map 302 demonstrates an unambiguous response signal for the tip of the index finger, and for the thumb tip.

Additionally, in one further embodiment, the palm normal may be used to determine the orientation of the palm itself, and to refine the plane defined for distinguishing the finger identity. The palm normal may be adjusted using the angle between the vector from the palm centre to the centre point position of the finger tips and the previously determined palm normal. This angle may be weighted according to some custom parameterization to make a smooth blending between the two information sets. The palm normal is computed using PCA and is set as being the least important direction.

Additionally, accurate estimates of the palm radius may be obtained from the distance map by using an estimate of the distance between the palm centre to the closest border of the hand, and, using the specification of the camera and the depth-value at the current location of the palm centre.

Additionally, a hand openness which may be typically a Boolean value that expresses whether the hand is open or closed may be also obtained from the previously determined POI. A hand is considered closed if there are no finger tips detected (that is, there are. no POI corresponding to the finger tips). If two POI are available, the hand openness may be updated using the ratio between the distance between the two selected POIs and the palm radius. If the ratio is smaller than a predetermined threshold and if the hand was previously considered opened, the openness of the hand will be adjusted and be flagged as closed. If the ratio becomes greater than another predetermined threshold, the hand will be considered to be open.

If the method described above for determining a POI in a hand is a preferred embodiment, step 100 of the present invention may alternatively or complementary use a model of the hand which is interacting within the field of view of the 3D imaging system. The model of the hand may be tracked and fitted onto the 3D point cloud corresponding to the hand. For instance, a skeletal model of the hand may be used. Known fitting and a tracking techniques enable the determination, in real-time, of the 3D position of each of the hand parameters. Two of the hand parameters may then be selected as being the two POIs from which 3D gestures are further recognised. The selection is easily made as each hand parameter is identified in the model, and, the gesture with which the interface will be controlled will define which hand parameters have to be selected. For example, the thumb finger tip and the index finger tip will be selected as the POIs for enabling the "pinching" 3D gesture, and the thumb finger tip with the hand tip will be selected as the two POIs for enabling the "grabbing" 3D gesture.

It is to be noted that detection and determination of POI, irrespective to the present method, may be performed onto a plurality of hands in the scene so as to enable multi-hand interactions as introduced later.

The second step (step 101) of the present invention comprises tracking and analysis over the time of the selection of POI on at least one hand determined step 100 in order to detect the required predetermined 3D gestures controlling the interactions with the GUI. According to the interaction expected and detailed in step 102, the different predetermined 3D gestures may be recognised independently, sequentially and preferably simultaneously from frame to frame. For performing recognition of the 3D gestures, first the position in space over the time of each POI is tracked.

In one first gesture recognition aspect, the 3D position over time of a single POI may be used for providing input to a conventional "pointing" gesture. The relative position in space of the selected POI enables a pointer displayed on screen to move accordingly. For instance, the POI may be the palm centre if no hand tips are available, the hand tip if no reliable finger tip is available, and preferably the index finger tip if available as it is naturally used for pointing, or any other finger tip if required. In one other embodiment, the other finger tip may be the virtual POI, the position of which in 3D space is computerised using an interpolated position from at least two of the predetermined hand parameters from among the palm centre, the finger tips, and the hand tip. Furthermore, the POI associated with the pointer in the GUI may have a position refined according to any other stable POI corresponding to a hand parameter. For instance, the position of the POI associated to the pointer in the GUI may be refined according to the position of the palm centre point in space as the palm centre point may be used for validating a real voluntary movement of the hand when the user is performing the pointing gesture. Determination of which POI is to be used may be set statically without flexibility, but may also be parametric and controlled by the interaction using the feedback loop 103. In an even more advantageous embodiment, continuity of the interaction may be made possible as the "pointing gesture" can be executed whatever the hand parameters available are from frame to frame. More precisely, an automation process comprising a state machine may be used to set the POI associated with the pointer in the GUI according to which hand parameter is available. For example, preferably, with respect to ergonomics and naturalness, the "pointing gesture" will be associated first to a virtual POI interpolated from two others, second from the POI corresponding to the index finger tip, third to the POI corresponding to the hand tip, and last but not least to the palm centre point as this one is always available.

Additionally, as introduced above, the position on screen of the pointer may be set relatively to the position in space of the POI with which it is associated. In one other embodiment, the position of the pointer may move with respect to absolute metric distance of the motion of the POI on the hand with which it is associated.

In a second gesture recognition aspect, two POIs are used for providing input corresponding to at least detection of the occurrence or the release of at least one dynamic gesture from among a "clicking gesture", a "grabbing gesture", or a "pinching gesture". The recognition of these gestures, their occurrence or their release, is intended to trigger individually, respectively a "start event" and a "stop event". In a preferred embodiment, the two POIs may be selected on the same hand as the one performing, potentially simultaneously, the continuous "pointing gesture". However, the two POIs may also be predetermined on another hand imaged by the range imaging sensor. In one embodiment, as the present invention may comprise automatically managing and determining the most ergonomic POI available for performing natural gesture based interactions due to the use of a state machine, when at least two POIs are available, distinguishing the "grabbing gesture" from the "pinching gesture" is made possible automatically with respect to the POIs selected in step 100. If the two POIs selected are the hand tip and the thumb tip, the gesture will be the "grabbing gesture" while if the two POIs selected are the index finger tip and the thumb tip, the gesture will be the "pinching gesture". The "clicking gesture" is also distinguished as it corresponds to any of the "grabbing gesture" or the "pinching gesture" characterised in that, when performing any one of those two gestures, the two POIs approach each other for a short period of time that is lower than a predetermined time threshold (for example, 0.5 s), the period during which the two POIs merge together and form one single POI (the kind of which may be typically detected as a hand tip), and the period after which the two initial POIs are again detected while returning to a contactless status/posture. The "clicking gesture" is a dynamic finger based 3D gesture.

In one particular embodiment corresponding to a state in which one single hand tip or one single finger tip is available, the "clicking gesture" is still made possible according to the present method as it can be triggered, in such a case, by a specific movement of the POI associated with the available extremity of that single hand. More precisely, a "clicking gesture" event may be triggered, if and only if, the POI performs a movement in the form of a single oscillation, for example, an up and down movement, the motion of which is lower than a predetermined distance threshold (for example, lower than 2 cm) and the duration of which is short below a time threshold (for example, lower than 0.5 s). This particular embodiment makes the interaction method more robust when POI tracking may be lost irrespective of the detection and tracking method used.

With respect to detection of occurrence and release events of respectively the "grabbing gesture" and the "pinching gesture", those events are respectively determined from analysis of the hand and finger based dynamic gestures. More precisely, the detection of occurrence and release events may be determined as a function of the identity of the two POIs being tracked (that is, the thumb fingertip and the hand fingertip, or the thumb fingertip and the index fingertip), when the two POIs are moving towards each other to form one single POI or when the distance between them becomes less than a predetermined threshold value (for example, 0.2 mm) respectively, a "grabbing occurrence event" or a "pinching occurrence event" may be triggered and may be set as a "start gesture event". When the two POIs having triggered a "start gesture event" by forming one single POI or when the distance between them has fallen below a predetermined threshold value (for example, 0.2 mm), and if the single POI re-forms into the two initial POIs or/and the distance between the two POIs increases above another predetermined threshold value (for example, 0.3 mm) respectively, a "grabbing release event" or a "pinching release event" may be triggered and may be set as a "stop gesture event". Preferably, an hysteresis function may be used with distance threshold criteria for detecting "start gesture event" and "stop gesture event" so as to avoid instability and jerky detection when the two POIs are close to the distance threshold values. For instance, in one preferred embodiment of the present invention with respect to ergonomics and natural gestures, the method comprises the analysis of at least two POIs selected from the hand tips for enabling "pinching" dynamic gesture detection. As described above, a "pinch" may correspond to two opposed tips, optionally displayed as at least one pointer, which are able to move towards one another, the distance between the two hand tips, associated POIs or pointers allowing the determination of a degree of "pinching" that is a continuous measurement. Preferably, the "pinching" gesture is predetermined as being a gesture performed when the thumb fingertip corresponding to a first selected POI, and the index fingertip corresponding to a second selected POI as described below with reference to FIG. 6.

In addition, in one even more preferred embodiment of the second step 101 of the present invention, for example, when the range imaging camera device is capturing a top-view of an interacting hand, such as, when the 3D camera device is situated in the roof of a car and the user sits with right hand freely operating, the method of the first embodiment may be improved by some additional processing the aim of which is to strengthen detection of "start gesture event" and "stop gesture event" by detecting availability of a hole in one predetermined perspective of the hand shape. It will be appreciated that the detection of the right hand is for cars having left hand drive (for example, in Europe, USA, Canada etc.), and the detection of the left hand is suitable for cars having right hand drive (for example, in the UK, Australia, New Zealand etc.)

According to the example cited, FIG. 6 illustrates a 2D top view or representation of a fingertip based "pinching" 3D gesture as shown at 600. Here, a preselected interacting hand comprises at least two clearly distinguished fingers and their fingertips, and the 2D shape shown at 610 of which (according to the perspective) comprises a hole 602 when the fingers are in the "pinching occurrence" pose that may trigger a "start 3D pinching gesture event" or simply a "start gesture event".

In such a way, the "pinching occurrence" pose corresponds to a "start" event from which any subsequent movement from the hand, or from at least one specific feature from the hand, such as, but not limited to, one predetermined point of interest (e.g. the centre of mass), will be tracked and analysed to determine which 3D gesture is performed. The tracking and analysis will be maintained until the hand pose is released, that is, in the present embodiment, up until the "pinching occurrence" pose is stops.

FIG. 7 shows the same hand shape representation 700 as that shown as 601 with hole 602 in FIG. 6. The hand shape representation 700 includes a hole 701 with an illustration of a plurality of parallel vicinity lines 706 projected from hand palm centre 703 along and parallel to the main direction of the hand 705 as determined by the PCA, and onto which, when detecting transition from matter of the hand (with a finite average depth value) to a void or a strongly different depth value (that is, a value corresponding to background or to a depth value with a difference from the finite average value of the hand matter which is above a predetermined threshold), at least two orthogonal rays 704 are projected up to the borders of the depth map corresponding to the representation to determine hand edges and hole candidate edges 702. More precisely, for each transition from "matter" to "no matter", the projected ray will enable to detect all the hand contours within the image. Furthermore for each transition, if the projected ray reaches the image border without transition, the transition is flagged as being a hand contour whereas the other detected edges on the casted rays are flagged as being hole candidates similar to that shown at 702. For each hole edge candidates, the path may then be checked as defining a loop. A path parsing algorithm may be used to measure the hole candidate contour length which must exceed a predetermined threshold to be validated as a real hole in the hand shape (for example, 2 cm). A plurality of vicinity rays 706 may be used to enable a complete and accurate contour detection within the hand.

Other methods for hole detection method may also be utilised. For example, the 3D point cloud or a 2D representation of a perspective of the hand being tracked may be clustered into a predefined number of clusters, which may be determined as function of the average distance of the hand to the imaging device or camera constrained by the average size of the clusters to a dimension compliant with hand parameters (e.g. finger size). Hole detection based on connected component analysis (that is, the connection of the clusters) may then be used to determine the presence or not of holes in the imaged hand. Number, size, shape or other parameters of the detected hole(s) may further be used to strengthen the detection step and validate the presence of a valid hole in the static pose adopted by the hand.

With respect to the previously described fingertip or hand tip based "pinching gesture" occurrence and "grabbing gesture" occurrence respectively and release detection, those gestures may be improved by using the aforementioned hole detection process which may comprise another state machine. For example, the "pinching gesture" occurrence and "grabbing gesture" occurrence respectively may only be validated, if and only if, the hole detection is validated. To this end, the state machine may be initialised with a "wait" status. As soon as two distinguished POIs from the hand tips are detected, the state machine is set to a "start" status. When the number of POIs goes from two to one following a movement of the two POIs towards one to the other, a validation step is launched checking, first, availability of a hole candidate, and, secondly, the stability of number of POIs available. If frequency of the number of POIs changes is higher than a predetermined threshold or no hole is detected, the validation of the "start event gesture" is rejected, if both are satisfied, the "start event gesture" is validated and the state machine status is set accordingly.

Further filtering from the state of the art such as hysteresis function may be applied to the state machine status so that to better avoid jerky changes in status.

The third and last step of the present invention, step 102, comprises the providing of a flexible, robust and natural human-to-computer interactions using information from the recognised 3D gestures (from step 101) as input information. The interaction scheme is more particularly characterised in that it requires necessarily three subsequent gestures to be performed, and that these three subsequent gestures enable the natural interaction. Among those gestures, at least one is a continuous dynamic gesture (hand or fingertip based), and the two others are gesture based events, preferably fingertip gesture based events. More precisely, within the continuous free movement of the hand of a user, the method may comprise detecting a first predetermined 3D gesture event that triggers the (start) beginning of a predetermined human-to-computer interaction, a second subsequent (continuous interaction) 3D gesture controlling the human-to-computer interaction, the second (continuous interaction) 3D gesture terminating when a third predetermined (stop) 3D gesture event is recognised.

Even more particularly, the first gesture event is preferably a 3D gesture performed with one of: a "clicking gesture", a "pinching gesture", a "grabbing gesture" or an open/close hand gesture. The second gesture is typically a "pointing gesture" enabling access to any part of the GUI when a pointer in the GUI is associated with the position of the POI from which the pointing gesture is relative, and, the third gesture is the release of the first gesture that triggers the end of the interaction, if considering the "pinching gesture", the "grabbing gesture", the "close hand event gesture", or a novel occurrence of the "clicking event gesture" or of the "open hand event gesture".

One particular advantage of the present interaction scheme is that it necessitates three subsequent predetermined gestures which enables natural hand and finger based interactions with a variety of GUI, the interaction encompassing those of the common device based interactive systems (for example, mice or touch screen) without need of any contact or contact element handled. For example, according to one embodiment of the present invention, a hand 3D gesture based interaction into a navigation system, such as, in car GPS system may be safely controlled using a single hand.

Figure 4:
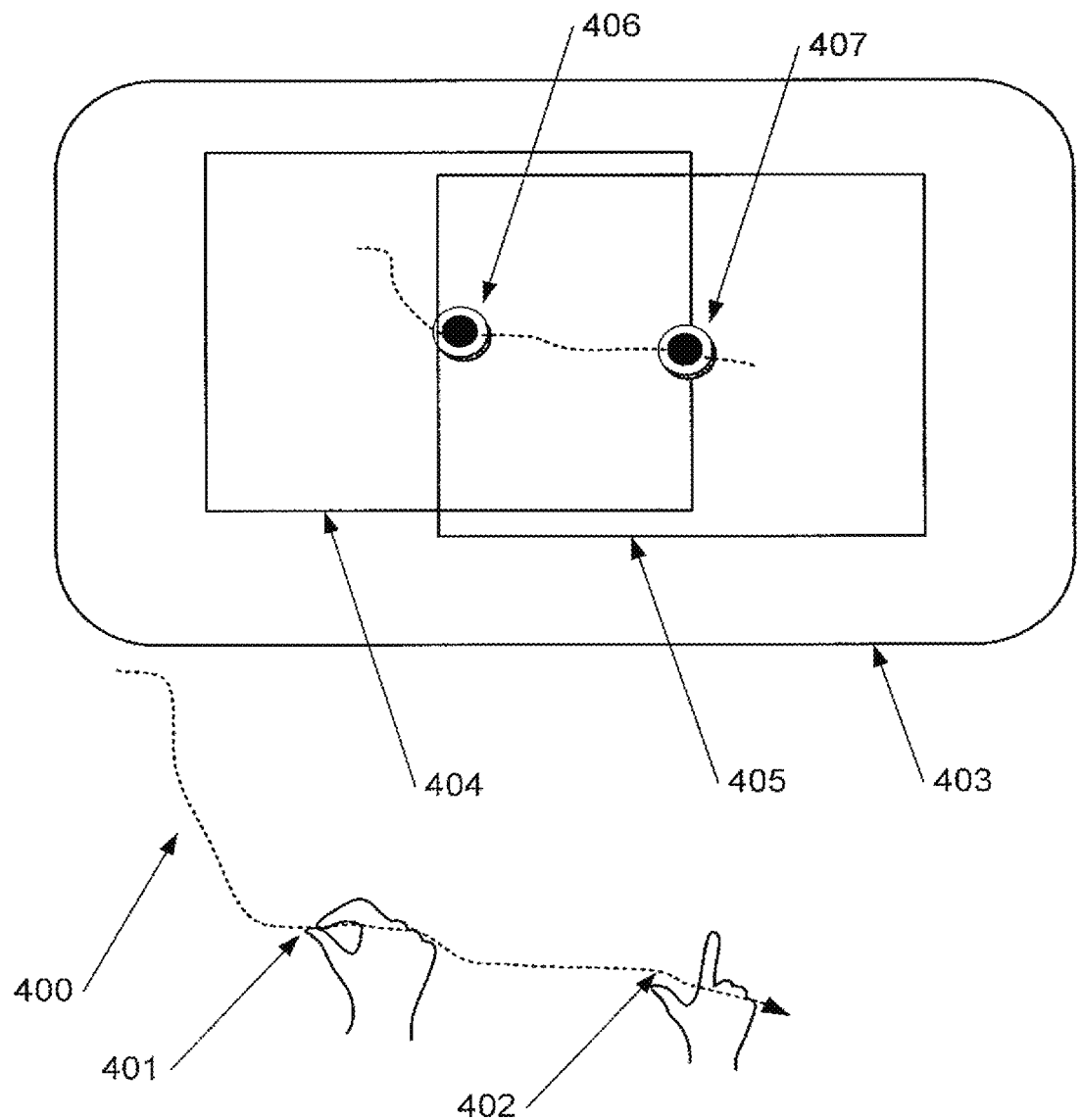
FIG. 4 illustrates a trajectory of a continuous and natural hand movement performed for scrolling a map on a screen with natural hand and finger based 3D gestures.

FIG. 4 illustrates a back view of a trajectory of a continuous hand movement 400 performed for navigating into a map on a screen 403 with natural hand based 3D gestures. The navigation comprises a scrolling interaction occurring in between the shown start gesture detection 401 and the stop gesture detection times 402 performed during the continuous hand movement with a trajectory indicated by the dotted line 400. The on-screen map relative displacement/scrolling changes the position of the map making area 404 centred at 406 be displaced to area 405 centred at 407 when interaction is terminated. To enable a visual feedback to the user with respect to the 3D gesture he/she is performing, a pointer associated to one POI in the interacting hand of the user may be displayed continuously.

For example, according to one another embodiment of the present invention, a hand 3D gesture based navigation into a GUI comprising different windows may be safely controlled using a single hand.

Figure 5:
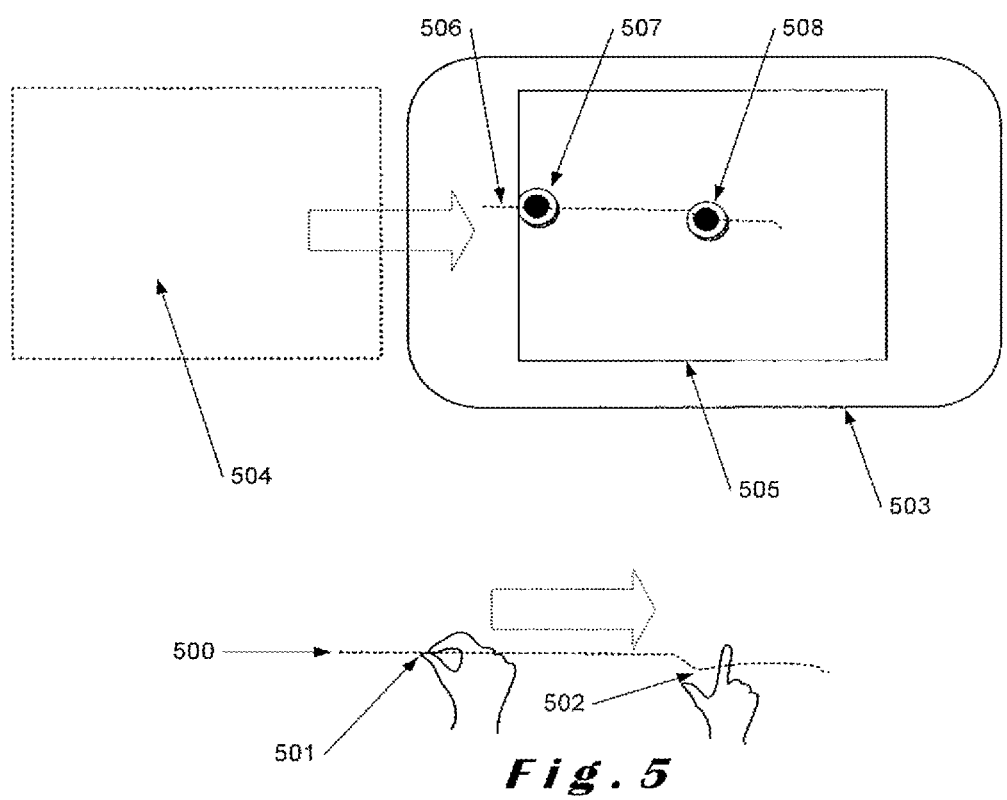
FIG. 5 illustrates a trajectory of a continuous natural movement of a hand performed for changing/sliding displayed windows on a screen with natural finger tip based start and stop interaction 3D gestures.

FIG. 5 illustrates a back view of a trajectory of a continuous hand movement 500 performed for changing slides or a GUI 505 into a display screen 503 with natural hand based 3D gestures. A pointer associated with a POI from one hand of the user may be displayed as feedback information. Its motion through trajectory 506 is made, for example, to be an absolute displacement relative to the absolute displacement as indicated by the dotted line 500 of the POI with which it is associated. During continuous motion of the interacting hand of the user, when the first "start event gesture" is triggered from detection of pinching gesture at 501, distance and direction of the natural continuous motion of the interacting hand are measured up until the "stop event gesture" is detected when the "pinching gesture" is release at 502. According to that movement corresponding to displacement of the pointer (shown by the circles) along trajectory 506 on which a "start gesture" event 507 and a "stop gesture" event 508 are shown, if the movement is higher than a predetermined distance threshold (for example, 5 cm), and if trajectory demonstrates a linearity correlation value (for example, a linear correlation ratio of 0.8) in a single direction, and if the movement is performed within a predetermined period of time (for example, less than 1 s). This causes the previously not displayed windows or GUI or slide 504 to be displayed, and the previously displayed windows or GUI or slide 505 to be erased from the screen. According to the interface, the trajectory may be at least one of an up, down, left, right movement, or a combination of those motions, and they may be intended to control and change menus, such as, enabling the transition from an audio menu to a GPS menu to a video menu, etc., in an automotive infotainment system.

For example, according to one another embodiment of the present invention, the interaction may comprises changing interfaces, windows or GUI without using distance and time thresholds, but by using a pointing gesture. More precisely, once the start gesture from one of a "clicking gesture", a "pinching gesture", a "grabbing gesture" is detected, the subsequent position of the pointer will determine the changes to the GUI as a function of its position with respect to the display screen. If the pointer reaches the top border of the screen, the GUI may be slide to the top so as, for example, to make slide a playlist of sounds in an audio system. The interaction may be set in according to any direction and be continuous or step-by-step based.

For example, according to one another embodiment of the present invention, the interaction may comprises zooming into a GUI. The zooming feature may be associated, for example, with the "grabbing gesture", enabling other kind of interaction using recognition of "the clicking" and/or the "pinching gesture". Once the "start event" as identified as a "grabbing gesture" occurrence is triggered, for example, continuous moving the hand closer to the display screen will zoom into the displayed GUI, and moving farther away from the display screen will zoom out of the GUI, while the grabbing gesture is held and up until it is released.

Although aspects of the present invention have been described with respect to specific embodiments, it will readily be appreciated that these aspects may be implemented in other forms, including combining using two hands for triggering, on one hand the "start and stop gesture", and on the other hand the continuous "interaction gesture".

The invention claimed is:

1. A method for providing natural human-to-computer interactions using a three-dimensional hand gesture based recognition system that includes a human-computer interaction mode during which movement associated with at least one hand of a user is analyzed to determine which three-dimensional gesture is performed by the user, the method comprising:

a) determining, using a range finding camera device, a plurality of points of interest located on the at least one hand of the user and/or determined relative to one or more points located on the at least one hand of the user;

b) recognizing, using a computer system in communication with the range finding camera device, a plurality of natural gestures performed by the user, wherein recognizing the plurality of natural gestures comprises:

b1) recognizing a first natural gesture corresponding to a first three-dimensional hand pose as a signal to trigger a beginning of a human-to-computer interaction, the recognition of the first natural gesture comprising determining when a distance between two points of interest of the plurality of points of interest is below a first predetermined value; and initiating a human-computer-interaction mode in response to recognizing the first natural gesture;

b2) maintaining the human-computer interaction mode while the distance between the two points of interest remains below the first predetermined value; and recognizing, during maintenance of the human-computer interaction mode, a second natural gesture as a human-to-computer interaction for interacting with a graphical user interface, wherein the human-to-computer interaction is a continuous interaction for interacting with the graphical user interface, the recognition of the second natural gesture comprising detecting movement of at least one point of interest of the plurality of points of interest; and b3) recognizing, during maintenance of the human-computer-interaction mode, a third natural gesture as a signal to trigger termination of the human-to-computer interaction, the recognition of the third natural gesture comprising determining when the distance between the two points of interest exceeds a second predetermined value; and terminating the human-computer interaction mode during which the recognizing of the second natural gesture occurs in response to the recognizing of the third natural gesture; and c) interacting with the graphical user interface based, at least in part, on recognition of the first natural gesture, recognition of the second natural gesture, and recognition of the third natural gesture.

2. The method according to claim 1, wherein b1) further comprises validating said first natural gesture when the corresponding first three-dimensional hand pose comprises a hole detected in a three-dimensional shape perspective.

3. The method according to claim 2, wherein b3) further comprises recognizing the third natural gesture when the hole is no longer detected.

4. The method according to claim 3, wherein b2) further comprises tracking a continuous change in position of the at least one point of interest.

5. The method according to claim 1, wherein b2) comprises detecting and tracking a continuous change in position of said at least one point of interest.

6. The method according to claim 5, wherein the two points of interest used for b1) and b3) are different than the at least one point of interest used for b2).

7. The method according to claim 1, further comprising:

associating an on-screen representation of a pointer with one of the plurality of points of interest associated with the at least one hand;

locking the on-screen representation of the pointer with at least one of: a movable element in a graphical user interface at which the pointer is pointing and a position in a displayed graphical user interface to which the pointer is pointing, when the first natural gesture is recognized in b1); and unlocking said on-screen representation when the third natural gesture is recognized in b3).

8. The method according to claim 7, further comprising, when the on-screen representation of the pointer is locked, b2) further comprises causing a change in position of the movable element corresponding to the change in position of the at least one point of interest corresponding to the second natural gesture.

9. The method according to claim 1, wherein said first and third natural gestures correspond respectively to activation and de-activation of at least one of: an open and close hand gesture; a finger tip based "clicking" gesture; a finger tip based "pinching" gesture; and a hand tip based "grabbing" gesture.

10. The method according to claim 1, wherein b2) further comprises using a change in position of the at least one point of interest for the second natural gesture to control one or more of: a scrolling of the graphical user interface; a zooming effect on the graphical user interface; a scrolling of an element associated with the graphical user interface; and/or a change of the graphical user interface.

11. The method according to claim 10, wherein the change of the graphical user interface is dependent on the direction of the second natural gesture performed in b2).

12. The method according to claim 1, wherein b) further comprises recognizing hand gestures using the plurality of points of interest associated with the hand of the user, the recognition being performed using one or more of: a three-dimensional hand skeleton modelling technique and/or a three-dimensional hand tips and parameters detection technique.

13. The method according to claim 1, wherein said first, second and third natural gestures are performed using one hand.

14. The method according to claim 1, wherein b1) and b3) are performed using the two points of interest associated with a first hand, and the at least one point of interest used in performing b2) is associated with a second hand.

15. The method according to claim 1, further comprising:
associating an on-screen representation of a pointer with a point of interest associated with the at least one hand;
locking the on-screen representation of the pointer with at least one of: a movable element in a graphical user interface at which the pointer is pointing and a position in a displayed graphical user interface to which the pointer is pointing, when the first natural gesture is recognized in b1); and
unlocking said on-screen representation when the third natural gesture is recognized in b3).

16. The method according to claim 15, further comprising, when the on-screen representation of at least one pointer is locked, b2) further comprises causing a change in position of the movable element corresponding to the change in position of the at least one point of interest corresponding to the second natural gesture.

17. The method according to claim 16, wherein said first and third natural gestures correspond respectively to activation and de-activation of at least one of: an open and close hand gesture, a finger tip based "clicking" gesture, a finger tip based "pinching" gesture, and a hand tip based "grabbing" gesture.

18. The method according to claim 17, wherein b2) further comprises using a change in position of the at least one point of interest for the second natural gesture to control one or more of: a scrolling of the graphical user interface, a zooming effect on the graphical user interface, a scrolling of an element associated with the graphical user interface, and a change of the graphical user interface.

19. The method according to claim 18, wherein b) further comprises recognizing hand gestures using the plurality of points of interest associated with the at least one hand of the user, the recognition being performed using one or more of: a three-dimensional hand skeleton modelling technique and a three-dimensional hand tips and parameters detection technique.

20. A method for providing natural human-to-computer interactions using a three-dimensional hand gesture based recognition system that includes a human-computer interaction mode during which movement associated with at least one hand of a user is analyzed to determine which three-dimensional gesture is performed by the user, the method comprising:

determining, using a range finding camera device, a plurality of points of interest located on the at least one hand of the user and/or determined relative to one or more points located on the at least one hand of the user, points of interest of the plurality of points of interest including at least one of an extremity of the hand, a finger tip, a hand tip, a center of mass of the hand, and/or a palm center;

recognizing, using a computer system in communication with the range finding camera, a first natural gesture corresponding to a first three-dimensional hand pose, the recognition of the first natural gesture comprising determining when a distance between two points of interest of the plurality of points of interest is below a first predetermined value;

initiating a human-computer-interaction mode in response to recognizing the first natural gesture;

maintaining the human-computer-interaction mode while the distance between the two points of interest remains below the first predetermined value;

recognizing using the computer system, during the maintenance of the human-computer interaction mode, a second natural gesture as a human-to-computer interaction for interacting with a graphical user interface, the recognition of the second natural gesture comprising detecting movement of at least one point of interest of the plurality of points of interest;

interacting with the graphical user interface based, at least in part on the second natural gesture;

recognizing, using the computer system and during maintenance of the human-computer-interaction mode, a third natural gesture, the recognition of the third natural gesture comprising determining when the distance between the two points of interest exceeds a second predetermined value, the second predetermined value being larger than the first predetermined value; and terminating the human-computer interaction mode during which the recognizing of the second natural gesture occurs in response to the recognizing of the third natural gesture.

* * * * *